United States Patent
Saitoh et al.

(10) Patent No.: US 12,189,159 B2
(45) Date of Patent: Jan. 7, 2025

(54) OPTICAL ELEMENT, LIGHT GUIDE ELEMENT, AND IMAGE DISPLAY ELEMENT

(71) Applicant: FUJIFILM Corporation, Tokyo (JP)

(72) Inventors: Yukito Saitoh, Minami-ashigara (JP);
Hiroshi Sato, Minami-ashigara (JP);
Katsumi Sasata, Minami-ashigara (JP);
Shigeaki Nimura, Minami-ashigara (JP)

(73) Assignee: FUJIFILM Corporation, Tokyo (JP)

( * ) Notice: Subject to any disclaimer, the term of this patent is extended or adjusted under 35 U.S.C. 154(b) by 678 days.

(21) Appl. No.: 17/401,477

(22) Filed: Aug. 13, 2021

(65) Prior Publication Data

US 2021/0373218 A1  Dec. 2, 2021

Related U.S. Application Data

(63) Continuation of application No. PCT/JP2020/005723, filed on Feb. 14, 2020.

(30) Foreign Application Priority Data

Feb. 14, 2019  (JP) .................. 2019-024295

(51) Int. Cl.
*G02B 5/30* (2006.01)
*F21V 8/00* (2006.01)

(52) U.S. Cl.
CPC ......... *G02B 5/3016* (2013.01); *G02B 5/3041* (2013.01); *G02B 6/0023* (2013.01); *G02B 6/005* (2013.01)

(58) Field of Classification Search
CPC .... G02B 6/005; G02B 6/0023; G02B 5/3041; G02B 5/3016
See application file for complete search history.

(56) References Cited

U.S. PATENT DOCUMENTS 5,691,789 A   11/1997  Li et al.
6,549,254 B1   4/2003  Grupp et al.
(Continued)

FOREIGN PATENT DOCUMENTS

JP   11-293252 A   10/1999
JP   2001-91944 A   4/2001
(Continued)

OTHER PUBLICATIONS

International Preliminary Report on Patentability and Written Opinion of the International Searching Authority (Forms PCT/IB/373 and PCT/ISA/237) for International Application No. PCT/JP2020/005723, dated Aug. 10, 2021, with an English translation.
(Continued)

*Primary Examiner* — Christopher Stanford
*Assistant Examiner* — Journey F Sumlar
(74) *Attorney, Agent, or Firm* — Birch, Stewart, Kolasch & Birch, LLP

(57) ABSTRACT

Provided are an optical element, a light guide element, and an image display element in which the occurrence of side-lobe is suppressed. The optical element includes a cholesteric liquid crystal layer that is obtained by immobilizing a cholesteric liquid crystalline phase, in which the cholesteric liquid crystal layer has a liquid crystal alignment pattern in which a direction of an optical axis derived from a liquid crystal compound changes while continuously rotating in at least one in-plane direction, and in a case where a birefringence in a thickness region of 80% as a center portion with respect to a thickness of the cholesteric liquid crystal layer is represented by $\Delta n1$, a birefringence in a thickness region of 10% from one surface of the cholesteric liquid crystal layer is represented by $\Delta n2$, and a birefringence in a thickness region of 10% from another surface of the cholesteric
(Continued)

liquid crystal layer is represented by Δn3, at least one of Δn2 or Δn3 is less than Δn1.

13 Claims, 6 Drawing Sheets

(56) References Cited

U.S. PATENT DOCUMENTS

| | | | |
|---|---|---|---|
| 2005/0074564 A1* | 4/2005 | Yamaoka | G02B 5/3016 428/1.1 |
| 2005/0266158 A1* | 12/2005 | Pokorny | G02B 5/3016 427/162 |
| 2013/0027656 A1 | 1/2013 | Escuti et al. | |
| 2013/0077040 A1 | 3/2013 | Escuti et al. | |
| 2015/0116649 A1* | 4/2015 | Watanabe | G02B 5/3016 156/60 |
| 2017/0190821 A1* | 7/2017 | Katoh | C08F 222/1025 |
| 2017/0349828 A1* | 12/2017 | Katoh | C08F 228/00 |
| 2018/0079958 A1* | 3/2018 | Ohno | G02B 5/3083 |
| 2018/0201701 A1* | 7/2018 | Muramatsu | G02B 5/3025 |
| 2018/0292713 A1* | 10/2018 | Drolet | G02F 1/133621 |
| 2018/0299610 A1* | 10/2018 | Saito | G02B 6/0036 |
| 2018/0358576 A1* | 12/2018 | Song | G02B 5/3016 |
| 2021/0026049 A1 | 1/2021 | Saitoh et al. | |
| 2021/0088703 A1 | 3/2021 | Saitoh et al. | |

FOREIGN PATENT DOCUMENTS

| | | |
|---|---|---|
| JP | 2010-525394 A | 7/2010 |
| JP | 2014-528597 A | 10/2014 |
| WO | WO 2016/066219 A1 | 5/2016 |
| WO | WO 2018/084076 A1 | 5/2018 |
| WO | WO 2019/189586 A1 | 10/2019 |
| WO | WO 2019/221294 A1 | 11/2019 |

OTHER PUBLICATIONS

International Search Report (Form PCT/ISA/210) for International Application No. PCT/JP2020/005723, dated Mar. 17, 2020, with an English translation.
Japanese Office Action for corresponding Japanese Application No. 2020-572329, dated Jun. 28, 2022, with English translation.
Japanese Office Action for corresponding Japanese Application No. 2020-572329, dated Dec. 13, 2022, with English translation.
Japanese Office Action for corresponding Japanese Application No. 2020-572329, dated May 30, 2023, with English translation.

* cited by examiner

OPTICAL ELEMENT, LIGHT GUIDE ELEMENT, AND IMAGE DISPLAY ELEMENT

CROSS-REFERENCE TO RELATED APPLICATIONS

This application is a Continuation of PCT International Application No. PCT/JP2020/005723 filed on Feb. 14, 2020, which claims priority under 35 U.S.C. § 119(a) to Japanese Patent Application No. 2019-024295 filed on Feb. 14, 2019. The above application is hereby expressly incorporated by reference, in its entirety, into the present application.

BACKGROUND OF THE INVENTION

1. Field of the Invention

The present invention relates to an optical element, a light guide element, and an image display element.

2. Description of the Related Art

A layer (hereinafter, also referred to as "cholesteric liquid crystal layer") obtained by immobilizing a cholesteric liquid crystalline phase is known as a layer that selectively reflects at least either right circularly polarized light or left circularly polarized light in a specific wavelength range. An optical element in which a reflection direction of reflected light is reflected obliquely instead of specular reflection by finely controlling an alignment state of the cholesteric liquid crystal layer. For example, WO2016/066219A discloses an optical element that selectively reflects circularly polarized light of incidence light obliquely in an oblique direction.

SUMMARY OF THE INVENTION

In this optical element, reflection properties having higher selectivity are required. In particular, it is required to suppress the occurrence of sidelobe. The sidelobe refers to a portion S in which a reflectance relatively increases at a wavelength in the vicinity of the outside of a selective reflection range B as shown in FIG. 1. When this sidelobe occurs, light having a wavelength that should not be reflected originally is reflected and causes double image recognition, which is not preferable.

Under the above-described circumstances, an object of the present invention is to provide an optical element in which the occurrence of sidelobe is suppressed.

In addition, another object of the present invention is to provide a light guide element and an image display element including the above-described optical element.

The present inventors conducted a thorough investigation in order to achieve the objects and found that the above-described objects can be achieved with a configuration of a liquid crystal layer satisfying predetermined properties.

That is, it was found that the objects can be achieved by the following configurations.

[1] An optical element comprising:
a cholesteric liquid crystal layer that is obtained by immobilizing a cholesteric liquid crystalline phase,
in which the cholesteric liquid crystal layer has a liquid crystal alignment pattern in which a direction of an optical axis derived from a liquid crystal compound changes while continuously rotating in at least one in-plane direction, and
in a case where a birefringence in a thickness region of 80% as a center portion with respect to a thickness of the cholesteric liquid crystal layer is represented by $\Delta n1$, a birefringence in a thickness region of 10% from one surface of the cholesteric liquid crystal layer is represented by $\Delta n2$, and a birefringence in a thickness region of 10% from another surface of the cholesteric liquid crystal layer is represented by $\Delta n3$, at least one of $\Delta n2$ or $\Delta n3$ is less than $\Delta n1$.

[2] The optical element according to [1], further comprising:
a first cholesteric liquid crystal layer that is formed of a composition including a first liquid crystal compound; and
a second cholesteric liquid crystal layer that is formed of a composition including a second liquid crystal compound to be provided on at least one surface of the first cholesteric liquid crystal layer,
in which a birefringence $\Delta n_{a2}$ of the second liquid crystal compound is less than a birefringence $\Delta n_{a1}$ of the first liquid crystal compound, and
the number of helical pitches of the second cholesteric liquid crystal layer is less than or equal to half of the number of helical pitches of the first cholesteric liquid crystal layer.

[3] A laminated optical element that is obtained by laminating the plurality of optical elements according to [1] or [2] in which reflection center wavelengths are different from each other and single periods over which an optical axis derived from a liquid crystal compound rotates by 180° in a plane are different from each other.

[4] A light guide element comprising:
any one of the optical element according to [1] or [2] or the laminated optical element according to [3].

[5] An image display element comprising:
the light guide element according to [4].

The present invention can provide an optical element in which the occurrence of sidelobe is suppressed.

The present invention can provide a light guide element and an image display element including the above-described optical element, in which double image can be suppressed for use in AR glasses.

DESCRIPTION OF THE PREFERRED EMBODIMENTS

Hereinafter, the details of the present invention will be described. In the present specification, numerical ranges represented by "to" include numerical values before and after "to" as lower limit values and upper limit values.

In addition, in the present specification, "(meth)acrylate" represents both of acrylate and methacrylate, "(meth)acryloyl group" represents both of an acryloyl group and a methacryloyl group, and "(meth)acryl" represents both of acryl and methacryl.

In the present invention, visible light refers to light having a wavelength which can be observed by human eyes among electromagnetic waves and refers to light in a wavelength range of 380 to 780 nm. Ultraviolet light is a light in a wavelength range of 10 nm or longer and shorter than 380 mu, and infrared light is a light in a wavelength range of longer than 780 nm.

In addition, in visible light, light in a wavelength range of 420 to 490 nm refers to blue light (B), light in a wavelength range of 495 to 570 nm refers to green light (G), and light in a wavelength range of 620 to 750 nm refers to red light (R).

In the optical element according to an embodiment of the present invention, liquid crystal has a periodic structure of submicrons to microns in an in-plane direction and has a periodic structure in a thickness direction. As a result, a structure where light is reflected in an oblique direction is adopted, and a structure where a birefringence, that is, Δn of refractive index anisotropy varies in the thickness direction is adopted.

The reason why the desired effect can be obtained with the above-described configuration is that reflected light derived from the periodic structure of liquid crystal having the birefringence of Δn and reflected light derived from an interface of a liquid crystal layer interfere with each other to be weakened such that sidelobe is reduced.

Hereinafter, the optical element according to the embodiment of the present invention will be described below using the drawings.

The optical element is a cholesteric liquid crystal layer formed of a composition including a cholesteric liquid crystal compound. In addition, the cholesteric liquid crystal layer has a liquid crystal alignment pattern in which a direction of an optical axis derived from a liquid crystal compound continuously rotates in one in-plane direction. In addition, the cholesteric liquid crystal layer has a structure where a birefringence derived from the liquid crystal compound, that is, a value of Δn of refractive index anisotropy varies in the thickness direction.

Figure 1:
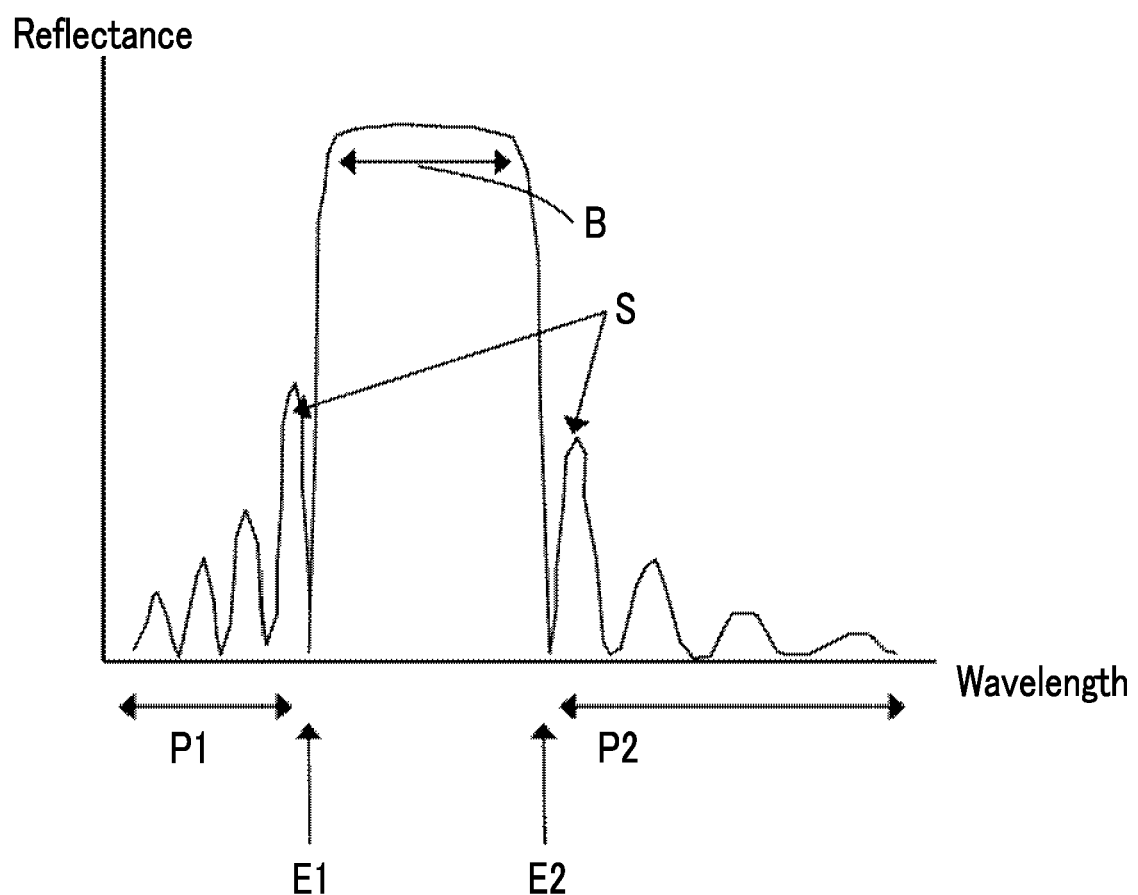
FIG. 1 is a graph showing general reflectance properties of a cholesteric liquid crystal layer.
Figure 2:
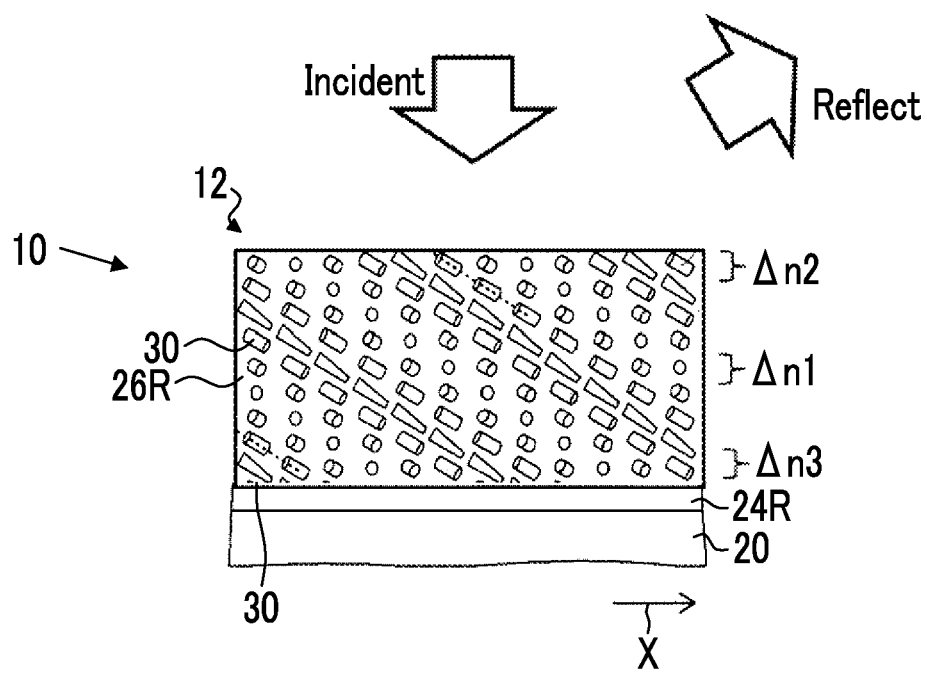
FIG. 2 is a cross-sectional view showing an embodiment of a reflection film that is an optical element according to the present invention.

FIG. 2 is a diagram conceptually showing an example of the optical element according to the embodiment of the present invention.

An optical element 10 in the example shown in the drawing includes: a reflective layer 26R that selectively reflects light in an oblique direction; a support 20; and an alignment film 24R. The reflective layer 26R is a cholesteric liquid crystal layer.

<Support>

As the support 20, various sheet-shaped materials (films or plate-shaped materials) can be used as long as they can support the alignment film and the cholesteric liquid crystal layer.

A transmittance of the support 20 with respect to corresponding light is preferably 50% or higher, more preferably 70% or higher, and still more preferably 85% or higher.

The thickness of the support 20 is not particularly limited and may be appropriately set depending on the use of the optical element 10, a material for forming the support 20, and the like in a range where the alignment film and the cholesteric liquid crystal layer can be supported.

The thickness of the support 20 is preferably 1 to 1000 μm, more preferably 3 to 250 μm, and still more preferably 5 to 150 μm.

The support 20 may have a single-layer structure or a multi-layer structure.

In a case where the support 20 has a single-layer structure, examples thereof include supports formed of glass, triacetyl cellulose (TAC), polyethylene terephthalate (PET), polycarbonates, polyvinyl chloride, acryl, polyolefin, and the like. In a case where the support 20 has a multi-layer structure, examples thereof include a support including: one of the above-described supports having a single-layer structure that is provided as a substrate; and another layer that is provided on a surface of the substrate.

<Alignment Film>

In the optical element 10, the alignment film 24R is formed on a surface of the support 20. The alignment film 24R is an alignment film for aligning a liquid crystal compound 30 to the predetermined liquid crystal alignment pattern.

Figure 7:
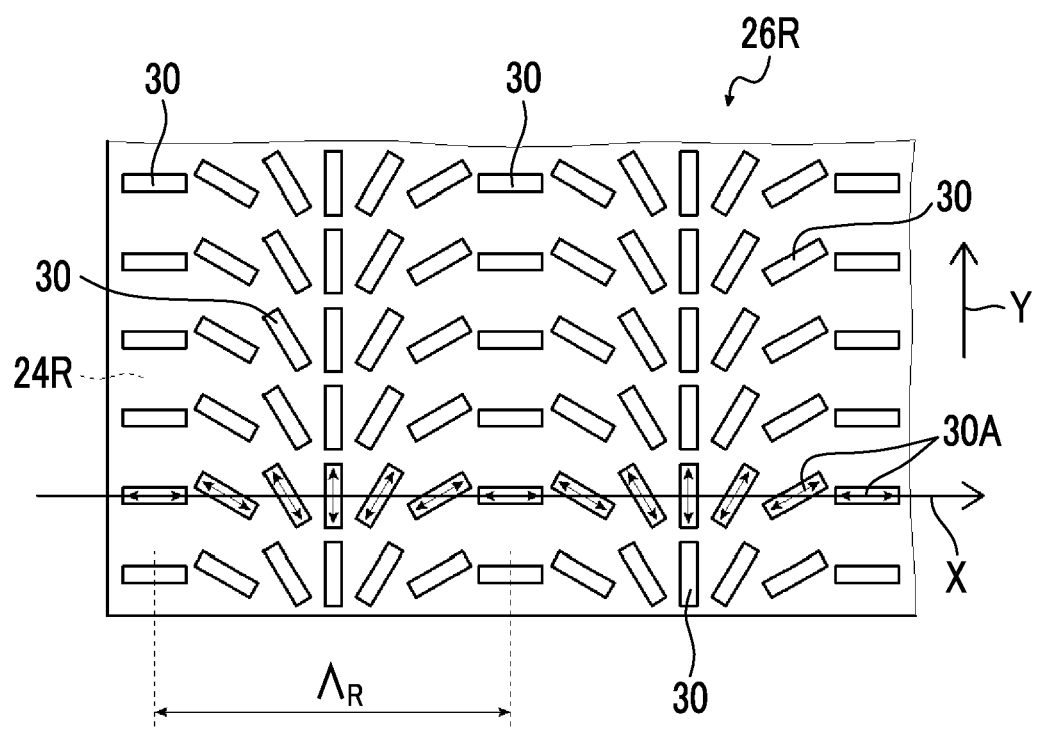
FIG. 7 is a plan view showing an alignment pattern.

Although described below, in the optical element 10 according to the embodiment of the present invention, the cholesteric liquid crystal layer has a liquid crystal alignment pattern in which a direction of an optical axis 30A (refer to FIG. 7) derived from the liquid crystal compound 30 changes while continuously rotating in one in-plane direction. The alignment film 24R aligns the liquid crystal compound in the cholesteric liquid crystal layer to a predetermined liquid crystal alignment pattern.

In addition, in the liquid crystal alignment pattern, a length over which the direction of the optical axis 30A rotates by 180° in the one in-plane direction in which the direction of the optical axis 30A changes while continuously rotating is set as a single period Λ (a rotation period of the optical axis). In the following description, "the direction of the optical axis 30A rotates" will also be simply referred to as "the optical axis 30A rotates".

As the alignment film, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, or methyl stearate.

The alignment film formed by a rubbing treatment can be formed by rubbing a surface of a polymer layer with paper or fabric in a given direction multiple times.

As the material used for the alignment film, for example, a material for forming polyimide, polyvinyl alcohol, a polymer having a polymerizable group described in JP1997-152509A (JP-H9-152509A), or an alignment film such as JP2005-097377A, JP2005-099228A, and JP2005-128503A is preferable.

In the optical element 10 according to the embodiment of the present invention, for example, the alignment film can be suitably used as a so-called photo-alignment film obtained by irradiating a photo-alignable material with polarized light or non-polarized light. That is, in the optical element 10 according to the embodiment of the present invention, a photo-alignment film that is formed by applying a photo-alignable material to the support 20 is suitably used as the alignment film.

The irradiation of polarized light can be performed in a direction perpendicular or oblique to the photo-alignment film, and the irradiation of non-polarized light can be performed in a direction oblique to the photo-alignment film.

Preferable examples of the photo-alignable material used in the photo-alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignable unit described in JP2002-265541A and JP2002-317013A; a photocrosslinking silane derivative described in JP4205195B and JP4205198B, a photocrosslinking polyimide, a photocrosslinking polyamide, or a photocrosslinking polyester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-12823A.

Among these, an azo compound, a photocrosslinking polyimide, a photocrosslinking polyamide, a photocrosslinking polyester, a cinnamate compound, or a chalcone compound is suitability used.

The thickness of the alignment film is not particularly limited. The thickness with which a required alignment function can be obtained may be appropriately set depending on the material for forming the alignment film.

The thickness of the alignment film is preferably 0.01 to 5 μm and more preferably 0.05 to 2 μm.

A method of forming the alignment film is not limited. Any one of various well-known methods corresponding to a material for forming the alignment film can be used. For example, a method including: applying the alignment film to a surface of the support 20; drying the applied alignment film; and exposing the alignment film to laser light to form an alignment pattern can be used.

Figure 8:
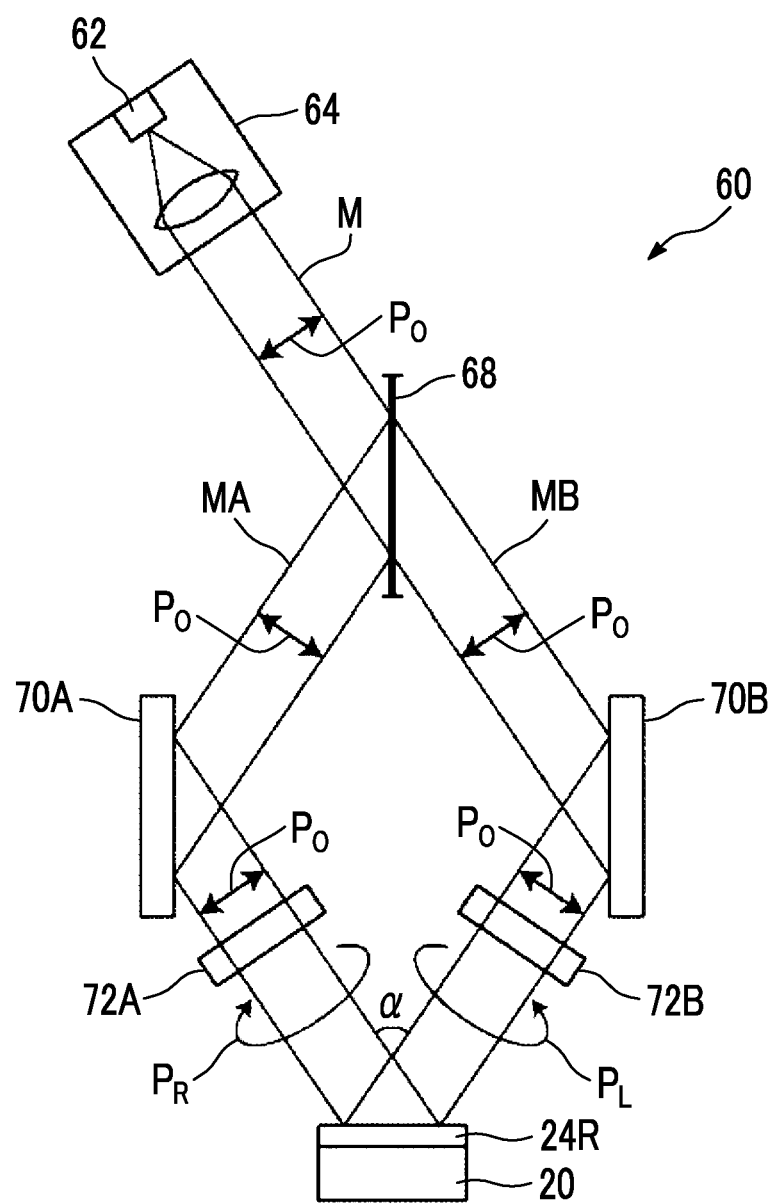
FIG. 8 is a diagram showing an example of an exposure device that forms the alignment pattern.

FIG. 8 conceptually shows an example of an exposure device that exposes the alignment film to form an alignment pattern.

An exposure device 60 shown in FIG. 8 includes: a light source 64 that includes a laser 62; a polarization beam splitter 68 that splits laser light M emitted from the laser 62 into two beams MA and MB; mirrors 70A and 70B that are disposed on optical paths of the splitted two beams MA and MB; and λ/4 plates 72A and 72B. Although not shown in the drawing, the light source 64 emits linearly polarized light $P_0$. The λ/4 plate 72A converts the linearly polarized light $P_0$ (beam MA) into right circularly polarized light $P_R$, and the λ/4 plate 72B converts the linearly polarized light $P_0$ (beam MB) into left circularly polarized light $P_L$.

The λ/4 plates 72A and 72B used herein are not particularly limited as long as they are λ/4 plates corresponding to wavelengths of light to be emitted. The exposure device 60 emits the laser light M. Therefore, for example, in a case where the center wavelength of the laser light M is 325 nm, a λ/4 plate that functions with respect to light having a wavelength of 325 nm may be used.

The support 20 including the alignment film 24R on which the alignment pattern is not yet formed is disposed at an exposed portion, the two beams MA and MB intersect and interfere each other on the alignment film 24R, and the alignment film 24R is irradiated with and exposed to the coherent light.

Due to the interference at this time, the polarization state of light with which the alignment film 24R is irradiated periodically changes according to interference fringes. As a result, in the alignment film 24R, an alignment pattern in which the alignment state periodically changes can be obtained.

In the exposure device 60, by changing an intersecting angle α between the two beams MA and MB, the period of the alignment pattern can be adjusted. That is, by adjusting the intersecting angle α in the exposure device 60, in the alignment pattern in which the optical axis 30A derived from the liquid crystal compound 30 continuously rotates in the one in-plane direction, the length of the single period over which the optical axis 30A rotates by 180° in the one in-plane direction in which the optical axis 30A rotates can be adjusted.

By forming the cholesteric liquid crystal layer on the alignment film having the alignment pattern in which the alignment state periodically changes, as described below, a cholesteric liquid crystal layer 26R having the liquid crystal alignment pattern in which the optical axis 30A derived from the liquid crystal compound 30 continuously rotates in the one in-plane direction can be formed. In addition, by rotating the optical axes of the λ/4 plates 72A and 72B by 90°, respectively, the rotation direction of the optical axis 30A can be reversed.

In the optical element according to the embodiment of the present invention, the alignment film is provided as a preferable aspect and is not an essential component.

For example, the following configuration can also be adopted, in which, by forming the alignment pattern on the support 20 using a method of rubbing the support 20, a method of processing the support 20 with laser light or the like, or the like, the cholesteric liquid crystal layer 26R or the like has the liquid crystal alignment pattern in which the direction of the optical axis 30A derived from the liquid crystal compound 30 changes while continuously rotating in at least one in-plane direction.

<Cholesteric Liquid Crystal Layer>

The cholesteric liquid crystal layer 26R is formed on a surface of the alignment film 24R.

The cholesteric liquid crystal layer 26R has a helical structure in which the liquid crystal compound 30 is helically twisted and laminated as in a cholesteric liquid crystal layer obtained by immobilizing a typical cholesteric liquid crystalline phase. In the helical structure, a configuration in which the liquid crystal compound 30 is helically rotated once (rotated by 360) and laminated is set as one helical pitch, and plural pitches of the helically twisted liquid crystal compound 30 are laminated. As a result, a function of reflecting light obliquely instead of specular reflection is exhibited.

In addition, the cholesteric liquid crystal layer has a structure where a birefringence derived from the liquid crystal compound, that is, a value of Δn of refractive index anisotropy varies in the thickness direction. In the structure, in a case where a birefringence in a thickness region of 80% as a center portion with respect to a thickness of the cholesteric liquid crystal layer is represented by Δn1, a birefringence in a thickness region of 10% from one surface of the cholesteric liquid crystal layer is represented by Δn2, and a birefringence in a thickness region of 10% from another surface of the cholesteric liquid crystal layer is represented by Δn3, at least one of Δn2 or Δn3 is less than Δn1. As a result, the occurrence of sidelobe is suppressed.

Here, the birefringence in the thickness region of 80% as the center portion with respect to a thickness of the cholesteric liquid crystal layer is represented by $\Delta n1$, refers to the average value of birefringence $\Delta n$ in the region of 80% as the center portion with respect to 100% of the entire thickness of the cholesteric liquid crystal layer excluding 10% of the thickness from each of both main surfaces. Likewise, each of the birefringence $\Delta n2$ and the birefringence $\Delta n3$ in the thickness regions of 10% from each surface of the cholesteric liquid crystal layer refer to the average value of birefringence $\Delta n$ in a thickness region of 10% from each surface of the cholesteric liquid crystal layer.

<<Method of Measuring $\Delta n$>>

In the present specification, examples of a method of measuring $\Delta n$ ($\Delta n1$, $\Delta n2$, $\Delta n3$) include a method of cutting a cross section from the cholesteric liquid crystal layer and analyzing the cross-section by ellipsometry to obtain $\Delta n$. By observation using a microscope with a rotating analyzer method or a rotating retarder method that is a general ellipsometry method, a region that appears periodically due to the cholesteric liquid crystal and where the liquid crystal compound is parallel to a cross-section of a cut piece is measured, and the measured value is analyzed. As a result, $\Delta n \times D$ and an optical axis can be obtained. Further, by measuring a thickness d of the cut piece, $\Delta n$ can be calculated.

By performing the above-described measurement at five or more points in the thickness direction to obtain the average value in each of the thickness region of 80% as the center portion and the thickness region of 10% from each of the surfaces, $\Delta n1$, $\Delta n2$, and $\Delta n3$ can be obtained.

$\Delta n$ of the cholesteric liquid crystal layer varies in the thickness direction but may have a single-layer structure or a multi-layer structure. In the case of the single-layer structure, in order to form the structure in which $\Delta n$ varies continuously or discontinuously in the cholesteric liquid crystal layer, for example, a $\Delta n$ distribution can be performed depending on a temperature gradient using a liquid crystal material that controls $\Delta n$ depending on a temperature. In this case, a liquid crystal compound described in JP2009-175208A can be preferably used. In addition, in the case of the multi-layer structure, a thickness direction distribution of $\Delta n$ can be formed by using liquid crystal compounds having different $\Delta n$ for application of multiple layers.

Figure 3:
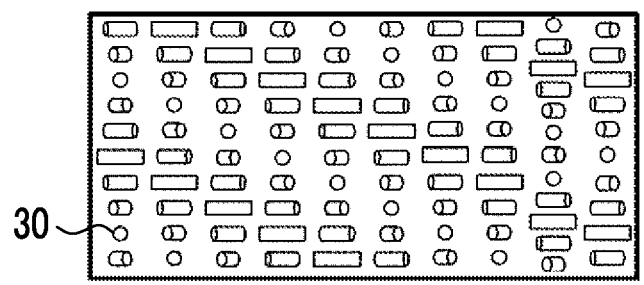
FIG. 3 is a cross-sectional view showing another embodiment of the reflection film.
Figure 4:
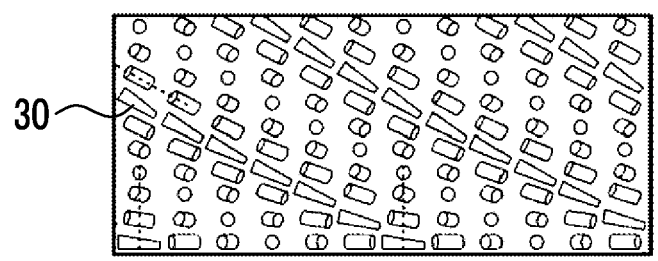
FIG. 4 is a cross-sectional view showing still another embodiment of the reflection film.

In addition, a helical axis of the cholesteric liquid crystal layer does not need to be oblique with respect to a substrate plane unlike FIG. 2 and may be perpendicular to the substrate as shown in FIG. 3. Alternatively, as shown in FIG. 4, a distribution (hybrid alignment distribution) where a helical axis angle changes in the thickness direction may be adopted. In particular, in the hybrid alignment distribution shown in FIG. 4, the effect of the thickness direction distribution of $\Delta n$ where the effect of the present invention is exhibited can be obtained depending on a liquid crystal alignment direction distribution, and effective $\Delta n$ with respect to a traveling direction of incidence light or emitted light can be changed depending on the liquid crystal alignment direction to decrease toward the surface of the liquid crystal layer, which is preferable.

Figure 5:
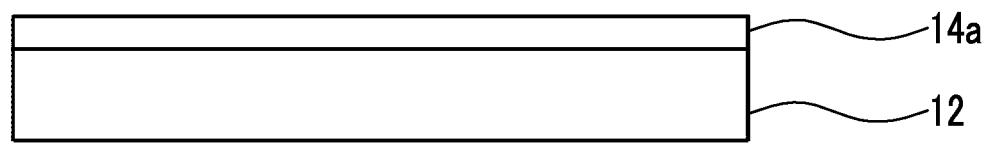
FIG. 5 is a cross-sectional view showing a reflection film in which two layers are laminated.

In addition, in a case where the cholesteric liquid crystal layer is configured with multiple layers, the cholesteric liquid crystal layer may be formed by laminating two layers as shown in FIG. 5. In this case, the cholesteric liquid crystal layer includes: a first cholesteric liquid crystal layer 12 that is formed of a first liquid crystal compound; and a second cholesteric liquid crystal layer 14a that is formed of a second liquid crystal compound to be provided on one surface (one of two main surfaces) of the first cholesteric liquid crystal layer 12.

A birefringence $\Delta n_{a1}$ of the first liquid crystal compound (refractive index anisotropy $\Delta n_{a1}$) is not particularly limited as long as it satisfies a predetermined relationship with a birefringence $\Delta n_{a2}$ (refractive index anisotropy $\Delta n_{a2}$) of the second liquid crystal compound described below.

The birefringence $\Delta n_{a1}$ of the first liquid crystal compound is likely to be 0.10 to 0.50.

It is preferable that the number of helical pitches of the second cholesteric liquid crystal layer is less than or equal to half of the number of helical pitches of the first cholesteric liquid crystal layer. In particular, from the viewpoint of further suppressing the occurrence of sidelobe, it is preferable that the number of helical pitches of the second cholesteric liquid crystal layer is less than or equal to ¼ of the number of helical pitches of the first cholesteric liquid crystal layer.

In addition, from the viewpoint of further suppressing the occurrence of sidelobe, it is preferable that the number of helical pitches of the second cholesteric liquid crystal layer is more than or equal to 1/10 of the number of helical pitches of the first cholesteric liquid crystal layer.

From the viewpoint of increasing reflectance, the number of helical pitches of the first cholesteric liquid crystal layer is preferably 6 or more, more preferably 8 or more, and still more preferably 10 or more.

The number of helical pitches of the second cholesteric liquid crystal layer is not particularly limited as long as it satisfies a predetermined relationship with the number of helical pitches of the first cholesteric liquid crystal layer. From the viewpoint of further suppressing the occurrence of sidelobe, the number of helical pitches of the second cholesteric liquid crystal layer is more preferably 5.0 or less and still more preferably 3.0 or less. The lower limit is not particularly limited and may be 1.0 or more.

The pitch length of the helical structure of the second cholesteric liquid crystal layer is not particularly limited and, in a case where a reflection center wavelength $\lambda$ is adjusted to be positioned in a visible range, is preferably 230 to 550 nm and more preferably 250 to 450 nm.

An absolute value of a difference between a reflection center wavelength of the first cholesteric liquid crystal layer and a reflection center wavelength of the second cholesteric liquid crystal layer is not particularly limited and, from the viewpoint of further suppressing the occurrence of sidelobe, is more preferably 50 nm or less and still more preferably 25 nm or less. The lower limit is not particularly limited and, for example, 0.

The second liquid crystal compound and the first liquid crystal compound are different from each other in the birefringence $\Delta n_a$. Specifically, the birefringence $\Delta n_{a2}$ of the second liquid crystal compound is less than the birefringence $\Delta n_{a1}$ of the first liquid crystal compound. In particular, from the viewpoint of further suppressing the occurrence of sidelobe, a ratio (%) (($\Delta_{na2}/\Delta_{na1}$)×100) of the birefringence $\Delta_{na2}$ of the second liquid crystal compound to the birefringence $\Delta_{na1}$ of the first liquid crystal compound is preferably 10% to 90% and more preferably 20% to 80%.

The birefringence $\Delta n_{a2}$ of the second liquid crystal compound is not particularly limited as long as it satisfies the above-described relationship and, from the viewpoint of further suppressing the occurrence of sidelobe, is preferably 0.25 or less and more preferably 0.20 or less. The lower limit is not particularly limited and may be 0.05 or more.

The second liquid crystal compound is different from the first liquid crystal compound only in birefringence and has the same preferable configuration as the first liquid crystal compound. Examples of the second liquid crystal compound include a rod-shaped liquid crystal compound and a disk-shaped liquid crystal compound.

<<Cholesteric Liquid Crystalline Phase>>

The cholesteric liquid crystalline phase exhibits selective reflection properties with respect to left or right circularly polarized light at a specific wavelength. Whether or not the reflected light is right circularly polarized light or left circularly polarized light is determined depending on a helical twisted direction (sense) of the cholesteric liquid crystalline phase. Regarding the selective reflection of the circularly polarized light by the cholesteric liquid crystalline phase, in a case where the helical twisted direction of the cholesteric liquid crystalline phase is right, right circularly polarized light is reflected, and in a case where the helical twisted direction of the cholesteric liquid crystalline phase is left, left circularly polarized light is reflected.

Accordingly, in the optical element 10 shown in the drawing, the cholesteric liquid crystal layer is a layer obtained by immobilizing a right-twisted cholesteric liquid crystalline phase.

A twisted direction of the cholesteric liquid crystalline phase can be adjusted by adjusting the kind of the liquid crystal compound that forms the cholesteric liquid crystal layer and/or the kind of the chiral agent to be added.

In addition, a half-width $\Delta\lambda$ (nm) of a selective reflection range (circularly polarized light reflection range) where selective reflection is exhibited depends on $\Delta n$ of the cholesteric liquid crystalline phase and the helical pitch P and complies with a relationship of $\Delta\lambda=\Delta n \times P$. Therefore, the width of the selective reflection range can be controlled by adjusting $\Delta n$. $\Delta n$ can be adjusted by adjusting a kind of a liquid crystal compound for forming the cholesteric liquid crystal layer and a mixing ratio thereof, and a temperature during alignment immobilization.

The half-width of the reflection wavelength range is adjusted depending on the application of the optical element 10 and is, for example, 10 to 500 nm and preferably 20 to 300 nm and more preferably 30 to 100 nm.

<<Method of Measuring $\Delta n_a$>>

As a method of measuring $\Delta n_a$ ($\Delta n_{a1}$, $\Delta n_{a2}$) in the present specification, a method of using a wedge-shaped liquid crystal cell described in, for example, "Liquid Crystal Handbook (edited by Editorial Committee of Liquid Crystal Handbook, Maruzen Publishing Co., Ltd.), page 202 is generally used. $\Delta n_a$ described above corresponds to a measured value at a wavelength of 550 nm at 30° C.

<<Method of Forming Cholesteric Liquid Crystal Layer>>

The cholesteric liquid crystal layer can be formed by immobilizing a cholesteric liquid crystalline phase in a layer shape. The structure in which a cholesteric liquid crystalline phase is immobilized may be a structure in which the alignment of the liquid crystal compound as a cholesteric liquid crystalline phase is immobilized. Typically, the structure in which a cholesteric liquid crystalline phase is immobilized is preferably a structure which is obtained by making the polymerizable liquid crystal compound to be in a state where a cholesteric liquid crystalline phase is aligned, polymerizing and curing the polymerizable liquid crystal compound with ultraviolet irradiation, heating, or the like to form a layer having no fluidity, and concurrently changing the state of the polymerizable liquid crystal compound into a state where the alignment state is not changed by an external field or an external force.

The structure in which a cholesteric liquid crystalline phase is immobilized is not particularly limited as long as the optical characteristics of the cholesteric liquid crystalline phase are maintained, and the liquid crystal compound 30 in the cholesteric liquid crystal layer does not necessarily exhibit liquid crystallinity. For example, the molecular weight of the polymerizable liquid crystal compound may be increased by a curing reaction such that the liquid crystallinity thereof is lost.

Examples of a material used for forming the cholesteric liquid crystal layer obtained by immobilizing a cholesteric liquid crystalline phase include a liquid crystal composition including a liquid crystal compound. It is preferable that the liquid crystal compound is a polymerizable liquid crystal compound.

In addition, the liquid crystal composition used for forming the cholesteric liquid crystal layer may further include a surfactant and a chiral agent.

—Polymerizable Liquid Crystal Compound—

The polymerizable liquid crystal compound may be a rod-shaped liquid crystal compound or a disk-shaped liquid crystal compound. Examples of the rod-shaped polymerizable liquid crystal compound for forming the cholesteric liquid crystalline phase include a rod-shaped nematic liquid crystal compound. As the rod-shaped nematic liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. Not only a low-molecular-weight liquid crystal compound but also a high-molecular-weight liquid crystal compound can be used.

The polymerizable liquid crystal compound can be obtained by introducing a polymerizable group into the liquid crystal compound. Examples of the polymerizable group include an unsaturated polymerizable group, an epoxy group, and an aziridinyl group. Among these, an unsaturated polymerizable group is preferable, and an ethylenically unsaturated polymerizable group is more preferable. The polymerizable group can be introduced into the molecules of the liquid crystal compound using various methods. The number of polymerizable groups in the polymerizable liquid crystal compound is preferably 1 to 6 and more preferably 1 to 3.

Examples of the polymerizable liquid crystal compound include compounds described in Makromol. Chem. (1989), Vol. 190, p. 2255, Advanced Materials (1993), Vol. 5, p. 107, U.S. Pat. Nos. 4,683,327A, 5,622,648A, 5,770,107A, WO95/22586, WO95/24455, WO97/00600, WO98/23580, WO98/52905, JP1989-272551A (JP-H1-272551A), JP1994-16616A (JP-H6-16616A), JP1995-110469A (JP-H7-110469A), JP1999-80081A (JP-H11-80081A), and JP2001-328973A. Two or more polymerizable liquid crystal compounds may be used in combination. In a case where two or more polymerizable liquid crystal compounds are used in combination, the alignment temperature can be decreased.

In addition, as a polymerizable liquid crystal compound other than the above-described examples, for example, a cyclic organopolysiloxane compound having a cholesteric phase described in JP1982-165480A (JP-S57-165480A) can be used. Further, as the above-described high-molecular-weight liquid crystal compound, for example, a polymer in which a liquid crystal mesogenic group is introduced into a main chain, a side chain, or both a main chain and a side chain, a polymer cholesteric liquid crystal in which a cholesteryl group is introduced into a side chain, a liquid crystal polymer described in JP1997-133810A (JP-H9-133810A), and a liquid crystal polymer described in JP1999-293252A (JP-H11-293252A) can be used.

—Disk-Shaped Liquid Crystal Compound—

As the disk-shaped liquid crystal compound, for example, compounds described in JP2007-108732A and JP2010-244038A can be preferably used.

In addition, the addition amount of the polymerizable liquid crystal compound in the liquid crystal composition is preferably 75% to 99.9 mass %, more preferably 80% to 99 mass %, and still more preferably 85% to 90 mass % with respect to the solid content mass (mass excluding a solvent) of the liquid crystal composition.

—Surfactant—

The liquid crystal composition used for forming the cholesteric liquid crystal layer may include a surfactant.

It is preferable that the surfactant is a compound that can function as an alignment controller contributing to the stable or rapid formation of a cholesteric liquid crystalline phase with planar alignment. Examples of the surfactant include a silicone surfactant and a fluorine surfactant. Among these, a fluorine surfactant is preferable.

Specific examples of the surfactant include compounds described in paragraphs "0082" to "0090" of JP2014-119605A, compounds described in paragraphs "0031" to "0034" of JP2012-203237A, exemplary compounds described in paragraphs "0092" and "0093" of JP2005-99248A, exemplary compounds described in paragraphs "0076" to "0078" and paragraphs "0082" to "0085" of JP2002-129162A, and fluorine (meth)acrylate polymers described in paragraphs "0018" to "0043" of JP2007-272185A.

As the surfactant, one kind may be used alone, or two or more kinds may be used in combination.

As the fluorine surfactant, a compound described in paragraphs "0082" to "0090" of JP2014-119605A is preferable.

The addition amount of the surfactant in the liquid crystal composition is preferably 0.01 to 10 mass %, more preferably 0.01 to 5 mass %, and still more preferably 0.02 to 1 mass % with respect to the total mass of the liquid crystal compound.

(Alignment Controller)

In a case where the liquid crystal composition according to the embodiment of the present invention is applied to the alignment film, it is preferable that at least one additive (alignment controller) for providing the region having a pretilt angle is added to at least one of an alignment film side or an air interface side. By adding the above-described additive to the composition, the region having a pretilt angle can be provided in the optical element.

In a case where the composition according to the embodiment of the present invention is applied to the alignment film, it is preferable that an air interface alignment agent may be added in addition to the liquid crystal compound in order to provide a pretilt angle to the air interface side. As a result, the region having a pretilt angle can be formed in at least one of upper and lower interfaces of the optically-anisotropic layer. The air interface alignment agent is a composition including: a fluoropolymer (X) including a constitutional unit represented by Formula (A) described below; and a fluoropolymer (Y) having a polar group without having the constitutional unit represented by Formula (A) described below. The air interface alignment agent is suitably used for forming an optically-anisotropic layer included in a phase difference plate according to the embodiment of the present invention described below.

In the present invention, as described above, by mixing the fluoropolymer (X) and the fluoropolymer (Y) with the air interface alignment agent, thickness unevenness of the formed optically-anisotropic layer can be suppressed, and the pretilt angle can be controlled.

Although the details are not clear, it is presumed that, by inserting the rod-shaped liquid crystal compound between fluoropolymers (X) arranged at a regular interval, the pretilt angle of the optically-anisotropic layer after polymerization can be controlled to be in a low tilt range. In addition, it is presumed that the fluoropolymer (Y) holds the arrangement of the fluoropolymers (X) such that thickness unevenness of the formed optically-anisotropic layer can be suppressed.

It is preferable that the air interface alignment agent in the composition according to the embodiment of the present invention includes at least: a fluoropolymer (X) including a constitutional unit represented by Formula (A) described below; and a fluoropolymer (Y) having a polar group without having the constitutional unit represented by Formula (A) described below.

Figure 6:
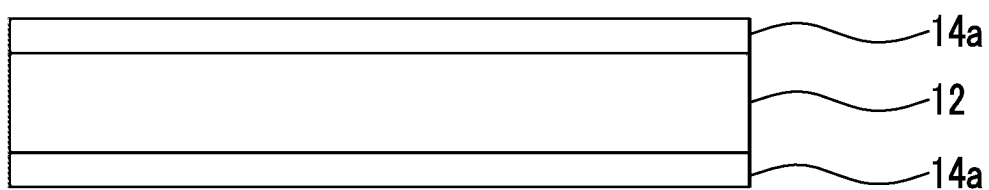
FIG. 6 is a cross-sectional view showing a reflection film in which three layers are laminated.

The cholesteric liquid crystal layer may be formed by laminating three layers as shown in FIG. 6. In this case, the cholesteric liquid crystal layer includes: a first cholesteric liquid crystal layer 12 that is formed of a composition including a first liquid crystal compound; and a second cholesteric liquid crystal layer 14a that is formed of a composition including a second liquid crystal compound to be provided on both surfaces (two main surfaces) of the first cholesteric liquid crystal layer 12.

The example shown in FIG. 6 has the same configuration as that of FIG. 5, except that the second cholesteric liquid crystal layer 14a is provided on both surfaces of the first cholesteric liquid crystal layer 12. As compared to the configuration of FIG. 5, the occurrence of sidelobe is further suppressed by disposing the second cholesteric liquid crystal layer 14a on both surfaces of the first cholesteric liquid crystal layer.

In addition, the cholesteric liquid crystal layer may be formed by laminating four or more layers. In this case, the occurrence of sidelobe is further suppressed by adopting the disposition where $\Delta n_a$ decreases toward the surface of the cholesteric liquid crystal due to the same effect as that of the two-layer or three-layer structure.

The liquid crystal layer formed by laminating a plurality of layers can be formed by application of multiple layers.

In the case of the application of multiple layers, in a case where liquid crystal is applied to the formed first liquid crystal layer, the second liquid crystal layer can be formed in a state where one in-plane direction in which the liquid crystal continuously rotates in the first liquid crystal layer is aligned with one in-plane direction in which the liquid crystal continuously rotates in the second applied liquid crystal layer.

In addition, the liquid crystal formed in the first layer and the liquid crystal formed in the second layer are in a state where cholesteric alignment is performed continuously in the thickness direction.

A laminated optical element according to the embodiment of the present invention is obtained by laminating the plurality of optical elements described above. In the cholesteric liquid crystal layers of the laminated optical element, reflection center wavelengths are different from each other and single periods over which an optical axis derived from a liquid crystal compound rotates by 180° in a plane are different from each other. For example, a laminated optical element in which an optical element that reflects red light (R light), an optical element that reflects green light (G light), and an optical element that reflects blue light (B light) are laminated can reflect R light, G light, and B light.

Here, the optical element according to the embodiment of the present invention can suppress the occurrence of sidelobe. Therefore, in a case where optical elements having different reflection center wavelengths are laminated, light having a wavelength can be prevented from being reflected from a reflective layer other than a desired reflective layer. For example, by making a reflection wavelength range of the G reflective layer to overlap a wavelength of sidelobe of the R reflective layer, unnecessary reflection from the R reflective layer in addition to desired reflection of G light from the G reflective layer can be prevented.

A light guide element according to the embodiment of the present invention includes any one of the above-described optical element or the above-described laminated optical element. In the example shown in FIG. 9, the optical element includes a light guide plate 42 and the optical element (laminated optical element) 10 and has a configuration where the optical element 10 is bonded to one end portion of a main surface of the light guide plate 42 and the optical element 10 is bonded to another end portion of the main surface of the light guide plate 42. In the light guide element, the optical element 10 is used as an incidence diffraction element that reflects incident light at an angle of total reflection in the light guide plate 42 to be incident into the light guide plate 42, and is used as an emission diffraction element that reflects the light that is guided by total reflection in the light guide plate 42 at an angle not satisfying total reflection conditions to be emitted from the light guide plate 42.

As the light guide plate 42, various light guide plates used for a backlight unit or the like of AR glasses or a liquid crystal display can be used without any particular limitation.

Figure 9:
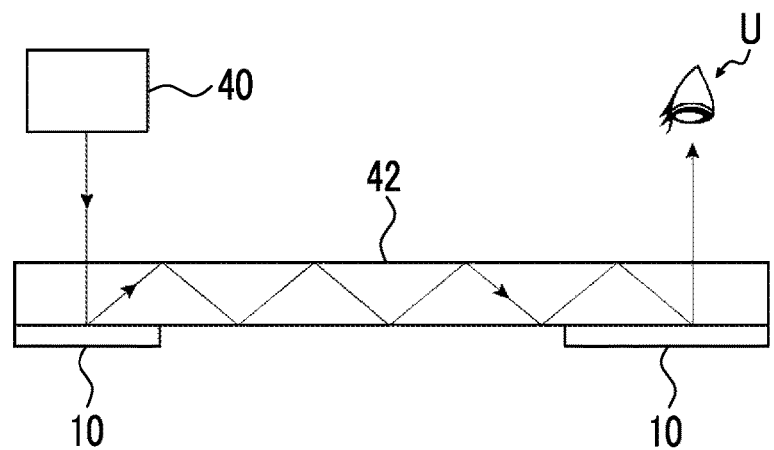
FIG. 9 is a diagram showing AR glasses used in the present invention.

An image display element according to the embodiment of the present invention includes the above-described light guide element. As shown in FIG. 9, the image display element includes the light guide element and a display 40. The display 40 is disposed to emit an image (light) to the optical element 10 as the incidence diffraction element. As shown in FIG. 9, when the display 40 emits an image, the image is reflected from the optical element 10 as the incidence diffraction element to be incident into the light guide plate 42 at an angle satisfying total reflection conditions. The incident light is totally reflected in the light guide plate 42 and guided to another end portion. The guided light is reflected at an angle not satisfying total reflection conditions by the optical element 10 as the emission diffraction element. The reflected light is emitted from the light guide plate 42. As a result, the image is displayed to a user U.

The display 40 is not particularly limited, and various well-known display elements (a display device or a projector) used for AR glasses or the like can be used without any particular limitation. In addition, the display 40 may include a display element and a projection lens.

Examples of the display element include a liquid crystal display (LCOS including Liquid Crystal On Silicon), an organic electroluminescent display, and a scanning type display employing a digital light processing (DLP) or Micro Electro Mechanical Systems (MEMS) mirror.

The display element may display a monochrome image, a two-color image, or a color image.

The projection lens may be a well-known projection lens (collecting lens) used for AR glasses or the like.

Here, in the image display element according to the embodiment of the present invention, a display image by the display 40, that is, light to be emitted from the display 40 is not limited and is preferably unpolarized light (natural light) or circularly polarized light.

In a case where the display element emits an unpolarized light image, it is preferable that the display includes, for example, a circular polarization plate including a linear polarizer and an λ/4 plate. In addition, in a case where the display element emits a linearly polarized light image, it is preferable that the display includes, for example, a λ/4 plate.

The light to be emitted by the display may be, for example, another polarized light such as linearly polarized light.

EXAMPLES

Hereinafter, the characteristics of the present invention will be described in detail using Examples and Comparative Examples. Materials, used amounts, ratios, treatment details, treatment procedures, and the like shown in the following Examples can be appropriately changed within a range not departing from the scope of the present invention. Accordingly, the scope of the present invention is not limited to the following specific examples.

Comparative Example G

Preparation of G Reflective Layer used in Comparative Example (Support and Saponification Treatment of Support)

As the support, a commercially available triacetyl cellulose film (manufactured by Fujifilm Corporation, Z-TAC) was prepared.

The support was caused to pass through a dielectric heating roll at a temperature of 60° C. such that the support surface temperature was increased to 40° C.

Next, an alkali solution shown below was applied to one surface of the support using a bar coater in an application amount of 14 mL (liter)/m², the support was heated to 110° C., and the support was transported for 10 seconds under a steam far infrared heater (manufactured by Noritake Co., Ltd.).

Next, 3 mL/m² of pure water was applied to a surface of the support to which the alkali solution was applied using the same bar coater. Next, water cleaning using a foundry coater and water draining using an air knife were repeated three times, and then the support was transported and dried in a drying zone at 70° C. for 10 seconds. As a result, the alkali saponification treatment was performed on the surface of the support.

| Alkali Solution | |
|---|---|
| Potassium hydroxide | 4.70 parts by mass |
| Water | 15.80 parts by mass |
| Isopropanol | 63.70 parts by mass |
| Surfactant | |
| SF-1: $C_{14}H_{29}O(CH_2CH_2O)_2OH$ | 1.0 part by mass |
| Propylene glycol | 14.8 parts by mass |

(Formation of Undercoat Layer)

The following undercoat layer-forming coating solution was continuously applied to the surface of the support on which the alkali saponification treatment was performed using a #8 wire bar. The support on which the coating film was formed was dried using warm air at 60° C. for 60 seconds and was dried using warm air at 100° C. for 120 seconds. As a result, an undercoat layer was formed.

| Undercoat Layer-Forming Coating Solution | |
|---|---|
| The following modified polyvinyl alcohol | 2.40 parts by mass |
| Isopropyl alcohol | 1.60 parts by mass |
| Methanol | 36.00 parts by mass |
| Water | 60.00 parts by mass |

Modified Polyvinyl Alcohol

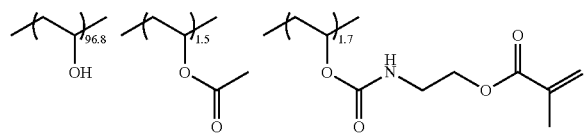

(Formation of Alignment Film)

The following alignment film-forming coating solution was continuously applied to the support on which the undercoat layer was formed using a #2 wire bar. The support on which the coating film of the alignment film-forming coating solution was formed was dried using a hot plate at 60° C. for 60 seconds. As a result, an alignment film was formed.

| Alignment Film-Forming Coating Solution | |
|---|---|
| The following material for photo-alignment | 1.00 part by mass |
| Water | 16.00 parts by mass |

| Alignment Film-Forming Coating Solution | |
|---|---|
| Butoxyethanol | 42.00 parts by mass |
| Propylene glycol monomethyl ether | 42.00 parts by mass |

Material for Photo-Alignment

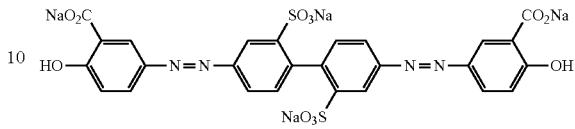

(Exposure of Alignment Film)

The alignment film was exposed using the exposure device shown in FIG. 8 to form an alignment film P-1 having an alignment pattern.

In the exposure device, a laser that emits laser light having a wavelength (325 nm) was used as the laser. The exposure dose of the coherent light was 100 mJ/cm². The single period (the length over which the optical axis rotates by 180°) of an alignment pattern formed by interference of two laser beams was controlled by changing an intersecting angle (intersecting angle α) between the two beams.

(Formation of G Reflection Cholesteric Liquid Crystal Layer)

As the liquid crystal composition forming the cholesteric liquid crystal layer, the following composition A-1 was prepared.

This composition A-1 is a liquid crystal composition forming a cholesteric liquid crystal layer (cholesteric liquid crystalline phase) that has a selective reflection center wavelength of 530 nm and reflects right circularly polarized light. Hereinafter, this cholesteric liquid crystal layer will be referred to as "G reflection cholesteric liquid crystal layer".

| Composition A-1 | |
|---|---|
| Rod-shaped liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Chiral agent Ch-1 | 5.68 parts by mass |
| Leveling agent T-1 | 0.08 parts by mass |
| Methyl ethyl ketone | 2660 parts by mass |

Rod-shaped liquid crystal compound L-1

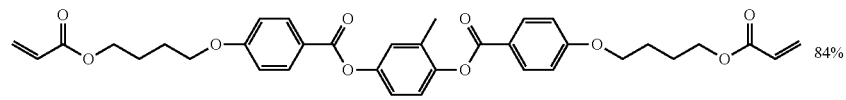

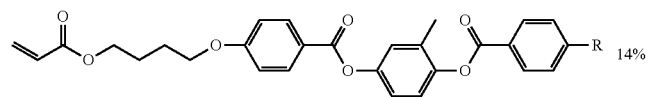

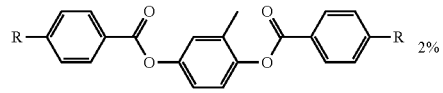

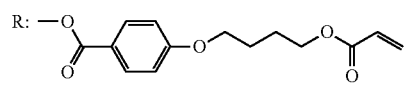

-continued

Composition A-1

Chiral Agent Ch-1

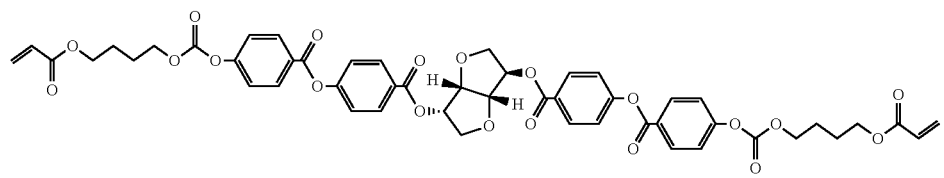 [SMILES: C=CC(=O)OCCCCOC(=O)Oc1ccc(C(=O)Oc2ccc(C(=O)O[C@H]3CO[C@@H]4[C@H]3OC[C@H]4OC(=O)c3ccc(OC(=O)c4ccc(OC(=O)OCCCCOC(=O)C=C)cc4)cc3)cc2)cc1]

Leveling Agent T-1

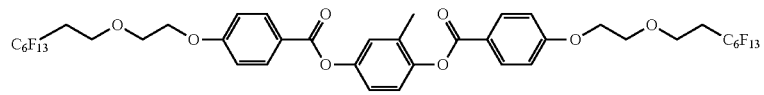

The G reflection cholesteric liquid crystal layer was formed by applying multiple layers of the composition A-1 to the alignment film P-1. The application of the multiple layers refers to a repetition of the following processes including: preparing a first liquid crystal immobilized layer by applying the first layer-forming composition A-1 to the alignment film, heating the composition A-1, cooling the composition A-1, and irradiating the composition A-1 with ultraviolet light for curing; and preparing a second or subsequent liquid crystal immobilized layer by applying the second or subsequent layer-forming composition A-1 to the formed liquid crystal immobilized layer, heating the composition A-1, cooling the composition A-1, and irradiating the composition A-1 with ultraviolet light for curing as described above. Even in a case where the liquid crystal layer was formed by the application of the multiple layers such that the total thickness of the liquid crystal layer was large, the alignment direction of the alignment film was reflected from a lower surface of the liquid crystal layer to an upper surface thereof.

Regarding the first liquid crystal layer, the following composition A-1 was applied to the alignment film P-1 to form a coating film, the coating film was heated using a hot plate at 95° C., the coating film was cooled to 25° C., and the coating film was irradiated with ultraviolet light having a wavelength of 365 nm at an irradiation dose of 100 mJ/cm$^2$ using a high-pressure mercury lamp in a nitrogen atmosphere. As a result, the alignment of the liquid crystal compound was immobilized. In this case, the thickness of the first liquid crystal layer was 0.2 µm.

Regarding the second or subsequent liquid crystal layer, the composition was applied to the first liquid crystal layer, and the applied composition was heated, cooled, and irradiated with ultraviolet light for curing under the same conditions as described above. As a result, a liquid crystal immobilized layer was prepared. This way, by repeating the application multiple times until the total thickness reached a desired thickness, a G reflection cholesteric liquid crystal layer was obtained, and a G reflective layer was prepared. In a case where a cross-section of a coating layer was observed with a scanning electron microscope (SEM), the cholesteric liquid crystalline phase of the G reflective layer had 13 pitches. In addition, $\Delta n_a$ of a rod-shaped liquid crystal compound L-1 used for forming the cholesteric liquid crystal layer was 0.16. In addition, the thickness was 4.6 µm.

In the liquid crystal alignment pattern of the G reflection cholesteric liquid crystal layer, the single period of the optical axis derived from the liquid crystal compound rotates by 180° in a plane was 0.41 µm.

In a case where the values of birefringence ($\Delta n2$, $\Delta n1$, $\Delta n3$) in three regions including a thickness region of 10%, a thickness region of 80%, and a thickness region of 10% of the prepared G reflection cholesteric liquid crystal layer were measured using the above-described method, all the values were 0.16.

Example G

Preparation of G Reflective Layer Used in Example

The G reflective layer according to Comparative Example included a layer of a compound L1, whereas a G reflective layer according to Example had a three-layer configuration including a compound 52, the compound L1, and a compound 52. Hereinafter, a method of preparing the G reflective layer will be described.

<Preparation of Forming Cholesteric Liquid Crystal Layer C>

A cholesteric liquid crystal layer C was prepared according to the same procedure as that of the preparation of Comparative Example, except that the amount of a chiral agent Ch1 used was adjusted such that the reflection center wavelength of the cholesteric liquid crystal layer formed using the compound 52 described in JP2016-053149A instead of the liquid crystal compound L1 was 530 nm and the thickness of the coating film was adjusted such that the number of helical pitches of the formed layer was 2.5. $\Delta na$ of the liquid crystal compound (compound 52) used for preparing the cholesteric liquid crystal layer C was 0.07. In addition, the thickness was 0.9 µm.

Compound 52

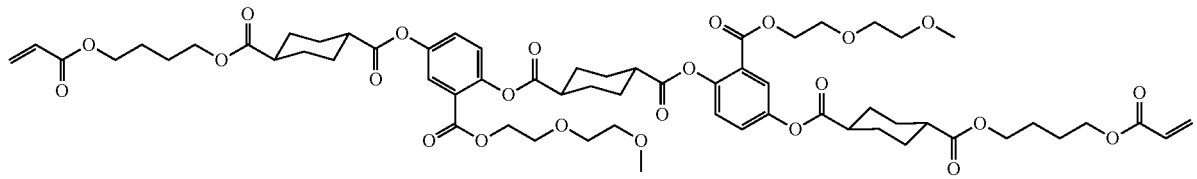

Next, multiple layers of the composition A-1 according to Comparative Example G were applied and laminated on the cholesteric liquid crystal layer C. A method of the application of multiple layers is the same as that of Comparative Example 1. By repeating the application of multiple layers, the liquid crystal layers formed of the composition A-1 corresponding to 8 pitches were additionally laminated and formed. The thickness of the layers that were additionally laminated was 2.8 μm.

Further, the cholesteric liquid crystal layers C corresponding to 2.5 pitches were applied and formed to be laminated on the liquid crystal layers. The thickness of the layers that were additionally laminated was 0.9 μm. As a result, a G reflective layer interposed between 2.5 pitches of cholesteric liquid crystal layers where $\Delta n_a = 0.07$ was prepared. In the G reflective layer, the number of pitches of cholesteric liquid crystal where $\Delta n_a = 0.16$ was 8, the total number of pitches was 13 (thickness was 4.6 μm), and the single period over which the optical axis derived from the liquid crystal compound rotated by 180° in a plane was 0.41 μm.

In a case where the values of birefringence ($\Delta n2$, $\Delta n1$, $\Delta n3$) in three regions including a thickness region of 10%, a thickness region of 80%, and a thickness region of 10% of the prepared G reflection cholesteric liquid crystal layer were measured using the above-described method, the values were 0.07, 0.14, and 0.07, respectively.

Comparative Example R

Preparation of R Reflective Layer Used in Comparative Example (Formation of R Reflection Cholesteric Liquid Crystal Layer)

Methyl ethyl ketone was applied to the prepared G reflection cholesteric liquid crystal layer by spin coating, and an alignment film was formed on the G reflection cholesteric liquid crystal layer using the same method as described above. Next, the alignment film was exposed using the same preparation method as that of the G reflection cholesteric liquid crystal layer, in a case where the alignment film was exposed using the exposure device, the intersecting angle between two light components was changed.

An R reflection cholesteric liquid crystal layer was prepared using the same method as that of the G reflection cholesteric liquid crystal layer, except that the amount of the chiral agent Ch-1 was changed to 4.69 parts by mass during the formation of the G reflection cholesteric liquid crystal layer. The cholesteric liquid crystalline phase of the R reflective layer had 13 pitches and a thickness of 5.6 μm. In the liquid crystal alignment pattern of the R reflection cholesteric liquid crystal layer, the single period of the optical axis derived from the liquid crystal compound rotates by 180° in a plane was 0.49 μm.

In a case where the values of birefringence ($\Delta n2$, $\Delta n1$, $\Delta n3$) in three regions including a thickness region of 10%, a thickness region of 80%, and a thickness region of 10% of the prepared R reflection cholesteric liquid crystal layer were measured using the above-described method, all the values were 0.16.

Example R

Preparation of R Reflective Layer Used in Example

The R reflective layer according to Comparative Example included a layer of the compound L1, whereas a G reflective layer according to Example had a three-layer configuration including the compound 52, the compound L1, and the compound 52. The R reflective layer was prepared using the same method as that of the G reflective layer according to Example, except that the reflection center wavelength of the formed cholesteric liquid crystal layer was adjusted to be 635 nm. As a result, an R reflective layer interposed between 2.5 pitches (thickness was 1.1 μm) of cholesteric liquid crystal where $\Delta n_a = 0.07$ was prepared. In the G reflective layer, the number of pitches of cholesteric liquid crystal where $\Delta n_a = 0.16$ was 8 (thickness was 3.4 μm), the total number of pitches was 13 (thickness was 5.6 μm), and the single period over which the optical axis derived from the liquid crystal compound rotated by 180° in a plane was 0.49 μm.

In a case where the values of birefringence ($\Delta n2$, $\Delta n1$, $\Delta n3$) in three regions including a thickness region of 10%, a thickness region of 80%, and a thickness region of 10% of the prepared R reflection cholesteric liquid crystal layer were measured using the above-described method, the values were 0.07, 0.14, and 0.07, respectively.

<Evaluation of Occurrence of Sidelobe>

Using a spectrophotometer (manufactured by JASCO Corporation, V-670), the reflectances of the reflection films according to Example G, Example R, Comparative Example G, and Comparative Example R were measured.

The prepared optical element was bonded to a dove prism (refractive index: 1.517, slope angle: 45°) such that light was incident from the prism side and the light reflected obliquely in the prism was able to be measured. An incidence angle was set such that incidence light transmitted through the linear polarizer and the λ/4 plate to be converted into right circularly polarized light and the reflected light was emitted to a measuring device at an angle substantially perpendicular to the slope.

Based on the obtained reflection spectrum data, a wavelength of an end portion E1 on the short wavelength side in the selective reflection range and a wavelength of an end portion E2 on the long wavelength side in the selective reflection range were determined. The end portion E1 on the short wavelength side in the selective reflection range refers to a wavelength having a minimum reflectance of a concave portion where the reflectance was initially 5% or less from the selective reflection range toward the short wavelength side. The end portion E2 on the long wavelength side in the selective reflection range refers to a wavelength having a minimum reflectance of a concave portion where the reflectance was initially 5% or less from the selective reflection range toward the short wavelength side.

A wavelength of a position P1 at a distance of 100 nm from the wavelength of the end portion E1 was calculated, and an integrated value V1 of reflectance between the wavelength of the end portion E1 and the wavelength of the position P1 was calculated. In addition, a wavelength of a position P2 at a distance of 100 nm from the wavelength of the end portion E2 was calculated, and an integrated value V2 of reflectance between the wavelength of the end portion E2 and the wavelength of the position P2 was calculated.

By adding the obtained integrated values V1 and V2, the reflectance values of sidelobe of Example G, Example R, Comparative Example G, and Comparative Example R were calculated. Relative values of reflectance of sidelobe of Example G, Example R, Comparative Example G, and Comparative Example R were calculated to perform evaluation based on the following standards.

"AA": lower than 40%
"A": 40% or higher and lower than 60%
"B": 60% or higher and lower than 100%
"C": 100% or higher and lower than 150%
"D": 150% or higher The evaluation results of Comparative Example G and Comparative Example R were C. On the other hand, the evaluation results of Example G and Example R were A, and an optical element in which unnecessary sidelobe was suppressed was able to be realized.

<Double Image Evaluation of Image Display Element>

The optical elements according to Comparative Example G and Comparative Example R were bonded through an adhesive material to obtain the laminated optical element 10 according to Comparative Example. The optical elements according to Example G and Example R were bonded through an adhesive material to obtain the laminated optical element 10 according to Example. Each of the laminated optical elements 10 according to Comparative Example and Example was bonded to a light guide plate.

Figure 10:
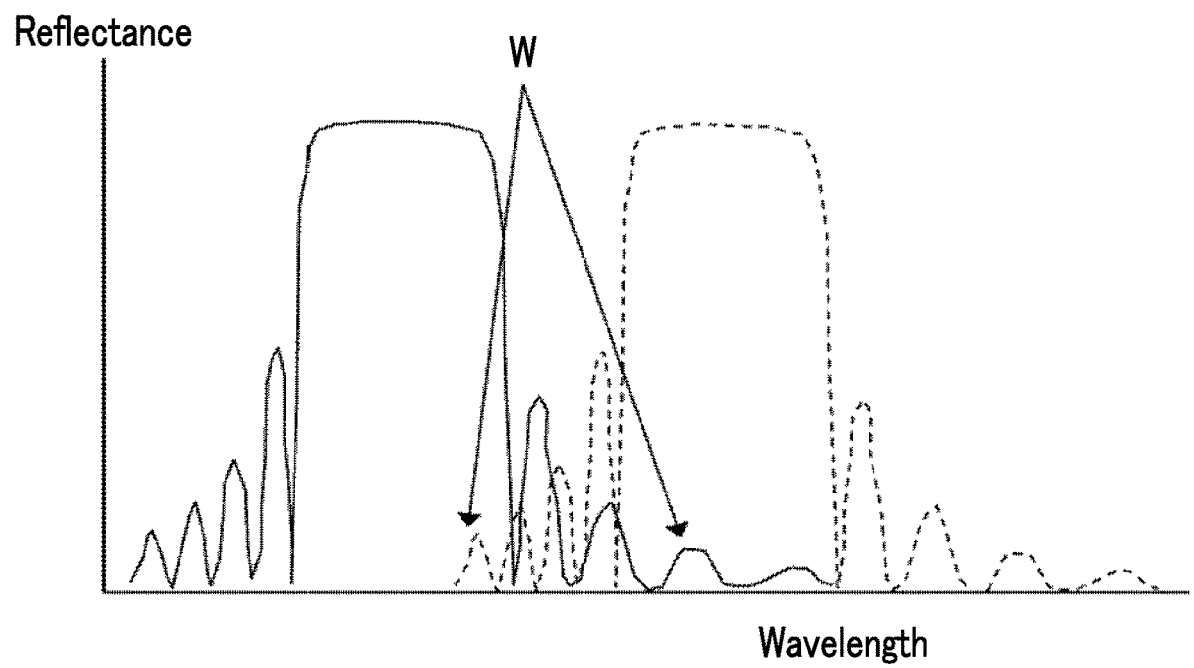
FIG. 10 is a graph showing reflectance properties in a case where unnecessary sidelobe occurs.

In order to prepare AR glasses as the image display element shown in FIG. 9, two laminated optical elements 10 that were the same were provided in the light guide plate 42 to be spaced from each other. The optical elements were bonded such that the G side having a short selective reflection center wavelength was the light incidence side, that is, the light guide plate side. The image of the display 40 was emitted to the laminated optical element 10, was reflected in the incidence direction, and was incident into the light guide plate 42 at an angle (a critical angle or more) sufficient for total reflection. After propagating in the light guide plate, the image reflected from the other optical element 10 obliquely in the direction of the user U was observed. In the laminated optical element 10, the G reflective layer and the R reflective layer were laminated. Therefore, when unnecessary sidelobe occurs, a reflection wavelength range of the G reflective layer overlaps a wavelength of sidelobe of the R reflective layer (w in FIG. 10). As a result, in addition to a desired image of G light from the G reflective layer, an unnecessary image from the R reflective layer was formed such that double image occurs, which is not preferable. The same shall be applied to the image of R light. This double image was evaluated by visual inspection.

In the evaluation result, the double image was observed and was not allowable in Comparative Example. In Example, the double image was not substantially observed. As a result, the effect of the present invention was exhibited.

EXPLANATION OF REFERENCES

10: optical element
12: first cholesteric liquid crystal layer
14a: second cholesteric liquid crystal layer
20: support
24R: alignment film
26R: reflection cholesteric liquid crystal layer
30: liquid crystal compound
30A: optical axis
40: display
42: light guide plate
60: exposure device
62: laser
64: light source
68: polarization beam splitter
70A, 70B: mirror
72A, 72B: λ/4 plate

What is claimed is:

1. An optical element comprising:
a cholesteric liquid crystal layer that is obtained by immobilizing a cholesteric liquid crystalline phase,
wherein the cholesteric liquid crystal layer has a liquid crystal alignment pattern in which a direction of an optical axis derived from a liquid crystal compound changes while continuously rotating in at least one in-plane direction, and
in a case where a birefringence in a thickness region of 80% as a center portion with respect to a thickness of the cholesteric liquid crystal layer is represented by $\Delta n1$, a birefringence in a thickness region of 10% from one surface of the cholesteric liquid crystal layer is represented by $\Delta n2$, and a birefringence in a thickness region of 10% from another surface of the cholesteric liquid crystal layer is represented by $\Delta n3$, at least one of $\Delta n2$ or $\Delta n3$ is less than $\Delta n1$.

2. The optical element according to claim 1,
the cholesteric liquid crystal layer comprising:
a first cholesteric liquid crystal layer that is formed of a composition including a first liquid crystal compound; and
a second cholesteric liquid crystal layer that is formed of a composition including a second liquid crystal compound to be provided on at least one surface of the first cholesteric liquid crystal layer,
wherein a birefringence $\Delta n_{a2}$ of the second liquid crystal compound is less than a birefringence $\Delta na1$ of the first liquid crystal compound, and
the number of helical pitches of the second cholesteric liquid crystal layer is less than or equal to half of the number of helical pitches of the first cholesteric liquid crystal layer.

3. A laminated optical element that is obtained by laminating the plurality of optical elements according to claim 1 in which reflection center wavelengths are different from each other and single periods over which an optical axis derived from a liquid crystal compound rotates by 180° in a plane are different from each other.

4. A light guide element comprising:
the optical element according to claim 1.

5. An image display element comprising:
the light guide element according to claim 4.

6. A laminated optical element that is obtained by laminating the plurality of optical elements according to claim 2 in which reflection center wavelengths are different from each other and single periods over which an optical axis derived from a liquid crystal compound rotates by 180° in a plane are different from each other.

7. A light guide element comprising:
the optical element according to claim 2.

8. An image display element comprising:
the light guide element according to claim 7.

9. A light guide element comprising:
the laminated optical element according to claim 3.

10. An image display element comprising:
the light guide element according to claim 9.

11. A light guide element comprising:
the laminated optical element according to claim 6.

12. An image display element comprising:
the light guide element according to claim 11.

13. The optical element according to claim 1,
wherein the cholesteric liquid crystal layer has a helical structure in which the liquid crystal compound is helically twisted and laminated.

\* \* \* \* \*